Oct. 12, 1937.  J. C. ERTEL  2,095,803
VACUUM CLUTCH CONTROL
Filed June 8, 1931  2 Sheets-Sheet 2
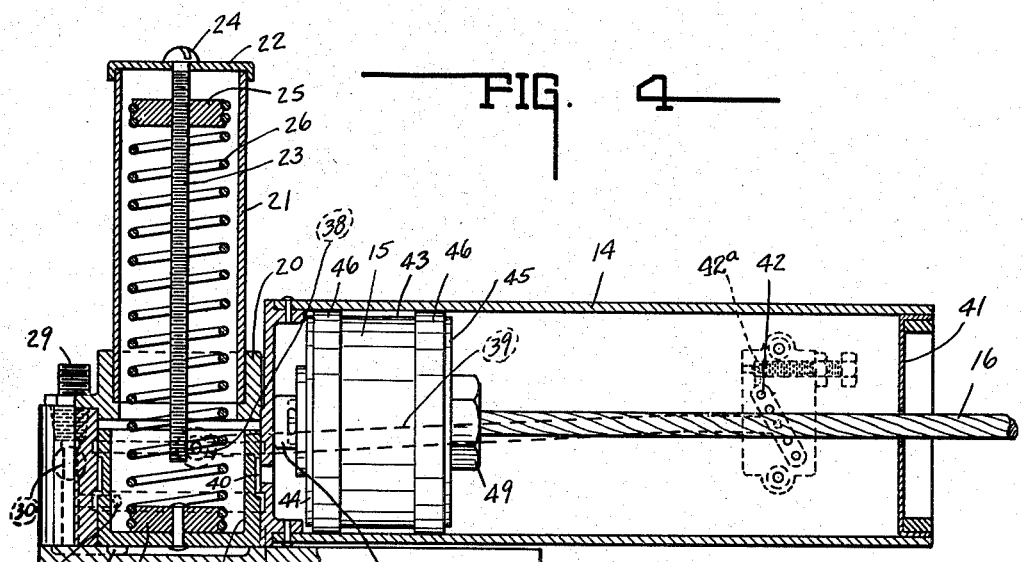
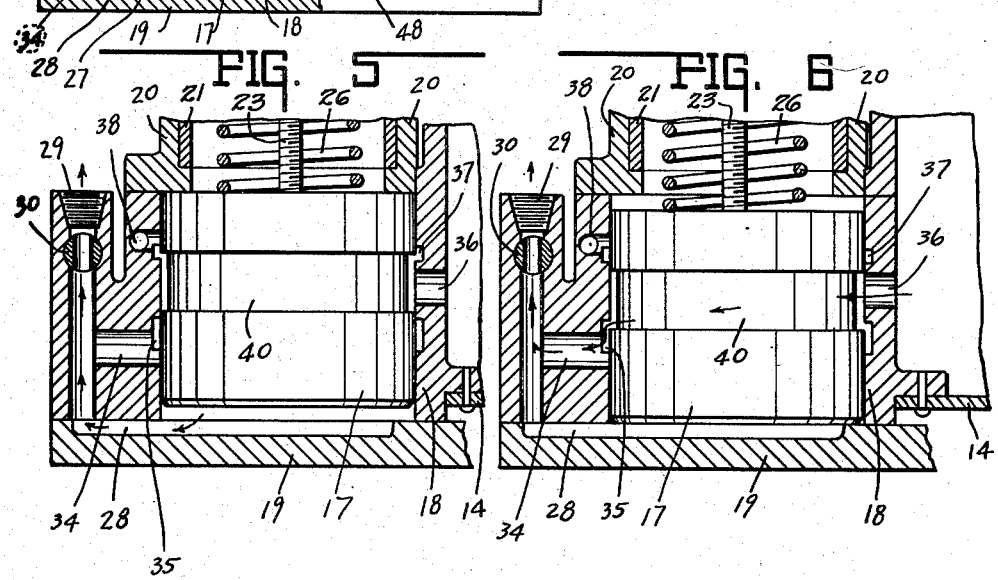
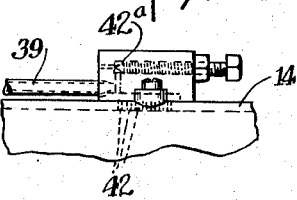
INVENTOR.
JOHN C. ERTEL.
BY
Lockwood Lockwood Goldsmith & Dort
ATTORNEYS.

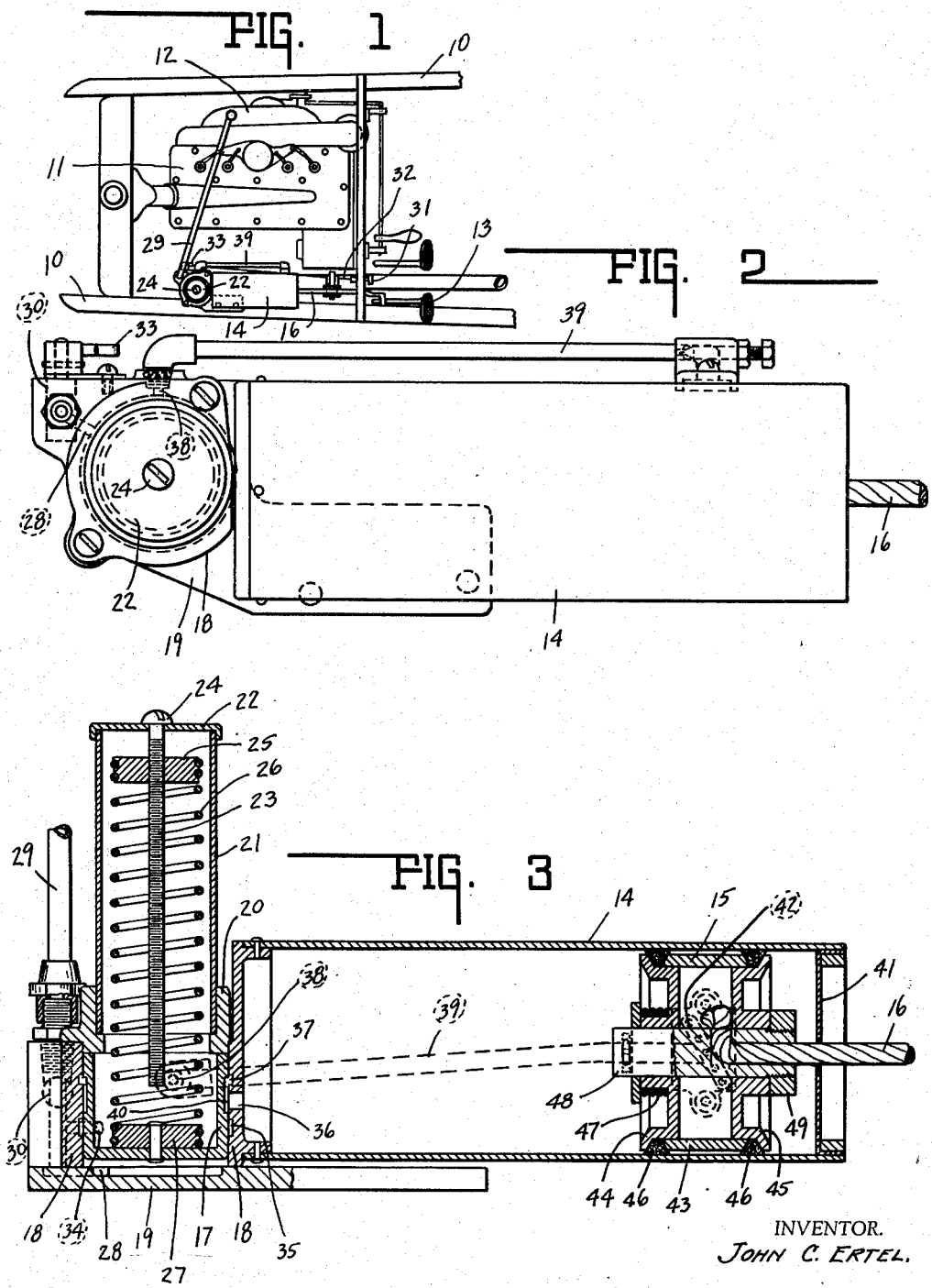

Patented Oct. 12, 1937

2,095,803

UNITED STATES PATENT OFFICE 2,095,803

VACUUM CLUTCH CONTROL

John C. Ertel, Indianapolis, Ind., assignor, by mesne assignments, to Bragg-Kliesrath Corporation, New York, N. Y., a corporation of New York Application June 8, 1931, Serial No. 542,778

9 Claims. (Cl. 192—.01)

This invention relates to a vacuum clutch control which will effect a so-called "free wheeling" of a vehicle driven by an internal combustion engine, by means of the action of the vacuum created by the suction of the motor directed to the releasing of the clutch when the throttle is closed.

It is well known that upon closing the throttle of an internal combustion engine so that it "idles", there is a substantial increase in the partial vacuum, whereas upon the throttle being opened so as to more freely admit the gas, the partial vacuum is substantially decreased.

It is the purpose of this invention to take advantage of and utilize the variations in partial vacuum to supply power for releasing and returning the clutch of the vehicle. Thus, while the vehicle is in motion and the operator removes his foot from the throttle pedal, the engine throttle is closed so as to produce a high partial vacuum, which in turn, releases the clutch and thereby disconnects the engine from the vehicle. This accomplishes a "free wheeling" which, in some instances, is highly desirable. Upon the foot throttle again being pressed down so as to open the engine throttle and speed up the motor, the partial vacuum is substantially destroyed which results in the clutch being again permitted to take hold, whereby the car will be driven by the motor in the normal manner.

Thus, in place of the usual over-running clutch built into the transmission for accomplishing the "free wheeling", this invention has for its purpose the use of the ordinary vehicle clutch which is automatically controlled for free wheeling purposes through the medium of the partial vacuum created by variations in speed of the motor.

One feature of the invention resides in the automatic control valve for controlling the vacuum or atmospheric pressure to the clutch operating cylinder, which valve in turn, as actuated by the partial vacuum created in the motor. The construction of the valve further permits a fine adjustment as to its sensibility so as to make the device applicable to motors of different displacements and power.

Another feature of the invention resides in the needle valve control for retarding the return movement of the piston and clutch when and to the extent desired, thereby easing the clutch into engagement in such manner as to prevent wear or jerking of the vehicle. This is accomplished by causing the air intake conduit to be primarily controlled by the clutch operating piston so that in its return movement, it will close the main port, after which air is permitted to enter through the adjustable needle valve, thereby retarding such return movement.

The full nature of the invention will be more clearly understood from the accompanying drawings and the following specifications and claims:

Figure 1 is a diagrammatical illustration of a vehicle having an internal combustion engine therein with the clutch control mounted thereon. Fig. 2 is a plan view of the clutch control. Fig. 3 is a central vertical section therethrough showing the control in inoperative position. Fig. 4 is the same as Fig. 3 showing the control in operable or clutch-releasing position. Fig. 5 is an enlarged view showing a portion of the control valve in position for re-engaging the clutch as shown in Fig. 3. Fig. 6 shows the valve in clutch-releasing position, as in Fig. 4. Fig. 7 is a view showing the valve for retarding the retraction of the piston.

In the drawings, there is shown a vehicle chassis 10 in which is mounted an internal combustion engine 11 having an intake manifold 12 provided with the usual throttle control, not shown. Mounted in the vehicle there is a clutch pedal 13 which in the usual manner is operated to release the clutch when pushed forwardly, and by a suitable clutch spring is returned to clutching engagement, thus disconnecting and connecting the driving motor with the vehicle.

Mounted upon the frame of the vehicle, there is a vacuum clutch control device comprising a cylinder 14 in which there is mounted a clutch-actuating piston 15. The piston 15 is connected by a cable 16 or other suitable means to the clutch pedal 13 or some part operably associated therewith. Thus, upon the piston 15 moving forwardly in the cylinder, it acts upon the clutch pedal to release the clutch against the tension of the usual clutch spring for disconnecting the driving motor from the vehicle and thereby cause the "free wheeling" thereof. Upon the piston 15 being permitted to move rearwardly, the usual clutch spring acts to return the clutch to engaging position so as to reconnect the driving motor with the vehicle. The clutch pedal, however, may be readily operated independently of the piston 15 through the flexibility of the connection 16, wherefore the control device will not interfere with the normal manual operation of the clutch.

Secured to the head of the cylinder 14, there is a control valve 17 acting within the valve housing 18 having a base portion 19, a rigid collar 20 and a cylindrical casing 21 provided with a top cap 22. The pressure necessary to actuate the valve is governed through the screw 23 having an adjusting head 24 exposed on the cap 22 through which it extends. Threaded upon the screw 24, there is a block 25 to which the upper end of a spring 26 is connected. The lower end of said spring is connected to the block 27 which is riveted to the bottom of the valve. Thus, the valve may be adjusted by positioning the block 25 relative to the block 27 or valve causing a variation in the spring tension of the spring 26. This results in varying the force necessary to actuate said valve. The bottom of the valve housing 18 below the valve 17 is in communication with the intake manifold 12 through the port 28 and conduit 29. A manually controlled valve 30 is mounted in the housing for opening and closing the communication between the port 28 and conduit 29, said valve being manually operated from the dash of the vehicle by the control handle 31, control rod 32 and connecting ear 33.

In addition to the port 28 communicating with the intake manifold, there is a second port 34 which is in communication with an annular recess 35 in the wall of the housing. Immediately above the recess 35, there is a port 36 extending through the wall of the housing and in communication with the cylinder 14. Thus, when the valve is in the position shown in Figs. 4 and 6, air is exhausted from the cylinder 14 through the port 36, recess 35—about the piston—port 34, and conduit 29, to the intake manifold 12, thereby creating a vacuum in the cylinder 14 for drawing the piston 15 forwardly and releasing the clutch.

The valve housing is provided with an annular recess 37 above the recess 35 and port 36 having a port 38 therein in communication with the conduit 39 which is in communication with the interior of the piston at a point therein where the piston 15 is normally at rest with the clutch in engagement. Thus, assuming that the piston 15 is in the position shown in Fig. 4, upon the valve being raised to the position shown in Figs. 3 and 5, the vacuum therein is released through the intake of air through the conduit 39, port 38, recess 37, and port 36.

For alternately causing the port 36 to be in communication with the recesses 35 and 37, the piston is provided with an annular recess 40, permitting communication between the port 36 and the lower recess 35 when the valve is in lowered position (Fig. 6), and between the port 36 and the recess 37 when in raised position (Fig. 5).

The conduit 39 is in communication with the interior of the cylinder 14 at the rear end thereof which is open to atmospheric pressure, being provided merely with a flexible dust protecting cap 41, through which the cable 16 extends. Said conduit communicates with the interior of the cylinder through a plurality of ports 42 extending about the wall of the cylinder. Thus, as the piston is retracted by the clutch spring, upon the partial vacuum being relieved, it will close the small ports 42, cutting off the main supply of air. Thereupon, the needle valve 42a permits a relatively slight amount of air to enter so as to gradually retard the movement of the piston until it finally comes to rest with the clutch in engagement and the ports 42 closed thereby. Thus, the piston 15 acts with the valve 17 to control the passage of air therethrough into the forward end of the cylinder.

The ports 42 are formed in the wall of the cylinder, and as best illustrated by the dotted lines of Fig. 4 and in Fig. 7 are positioned in a row extending at an angle to the axis of the cylinder. There are five of said ports as shown herein so that the air intake therethrough and through the conduit 39 will be equivalent to five times the area of the respective ports. As the piston is retracted by the spring of the clutch pedal through the cable 16, the packing 46 will close the first of the ports 42 so as to reduce the air intake through the conduit 39 to the remaining effective area or four times the area of each port. As the piston is further retracted the second, third, fourth, and finally the fifth port will be closed, reducing the effective area and the air passage through the conduit 39 accordingly. Thus, as the piston is retracted, there will be a decreasing amount of air available to the front end of the cylinder which will act to slow up the retracting movement of the piston and permit the clutch to gradually take hold. Variations in the slowing up of the piston and the gradual taking hold of the clutch may be adjusted through the medium of the needle valve 42a so as to adapt this action to clutches having different "grabbing" peculiarities.

For maintaining a perfect seal of the piston 15 within the cylinder, said piston comprises a cylindrical collar 43 surrounding the piston heads 44 and 45. The packing material 46 is wedged between the collar 43 and their respective heads by flanged bevelled surfaces. Pressure exerted therebetween tends to force the packing outwardly against the wall of the cylinder. Such pressure is created by the compression spring 47 mounted between the collar 44 and the adjacent end of the rod 48 upon which said collar is slidably mounted, said rod having a nut 49 provided on the other end thereof. Thus, both collars are pulled together under spring tension against the packing 46 for forcing it outwardly. The cable 16 extends through the rod 48 and is anchored within the piston between said collars.

In operation, wherein it is desired by the operator that the clutch control be put in operation for "free wheeling", the dash control 31 is operated to open the valve 30. If by reason of the type of driving being done, it is not desired to "free wheel", the valve is closed and the device will not operate so that the vehicle clutch is manually controlled in a normal way.

Assuming that the valve 30 is open, upon the throttle being closed, a substantial vacuum will be created in the manifold 12 and communicated to the valve 17 through the port 28. This will tend to pull the valve downwardly against the resistance of the spring 26 until the passage is opened between the manifold and the cylinder 14 through the ports 34 and 36, recesses 35 and 40. The air being exhausted from the cylinder, the atmospheric pressure through the open end thereof will force the piston 15 forwardly from the position shown in Fig. 3 to that shown in Fig. 4, which will in turn, release the clutch. Upon opening the throttle so as to substantially decrease the vacuum created in the intake manifold, the spring 26 will raise the valve 17 from the positions shown in Figs. 4 and 6 to the positions shown in Figs. 3 and 5. Thereupon, the communication between the cylinder 14 and intake manifold will be closed and communication between the cylinder and atmospheric pressure will be opened through ports 36 and 38, recesses 37 and 40, conduit 39 and ports 42.

Thus, pressure on the piston will be equalized so that the clutch spring will draw the piston rearwardly until it reaches the position where it closes the ports 42. When desired, the needle valve 42a may be adjusted to permit a further retarded movement of the piston to gradually let the clutch back into engagement.

Depending upon the displacement of the motor and the vacuum created thereby, an adjustment may be made through the screw 28 for varying the resistance of the spring 26 so that the valve may be operated more or less readily by the vacuum through the port 28.

The invention claimed is:

1. The combination with an internal combustion engine having a throttle controlled intake manifold, of a clutch connecting the engine with a driven mechanism, a vacuum cylinder, a piston therein operatively connected with said clutch, said piston serving to divide the cylinder into two compartments, an exhaust conduit leading from the cylinder to the intake manifold whereby the air is exhausted by the suction created therein, an air supply port to the cylinder, and means for controlling said air supply port comprising a conduit interconnecting said port with one compartment of said cylinder, and valve means, comprising said piston and a portion of said cylinder having openings therein, operable to control the flow of air through said latter conduit.

2. The combination with an internal combustion engine having a throttle controlled intake manifold, of a clutch connecting the engine with a driven mechanism, a vacuum cylinder, a piston therein operatively connected with said clutch, said piston serving to divide the cylinder into two compartments, an exhaust conduit leading from the cylinder to the intake manifold whereby the air is exhausted by the suction created therein, and an air supply port to the cylinder adapted to be opened and closed by the position of said piston.

3. The combination with an internal combustion engine adapted to create a vacuum, of a clutch connecting the engine with a driven mechanism, a vacuum operable device for actuating said clutch, said device comprising two power fluid receiving compartments, a conduit leading from said device to said internal combustion engine, a valve in said conduit for controlling the vacuum pressure in said device, a by-pass conduit interconnecting said valve with one compartment of said device, and valve means for controlling the flow of fluid through said by-pass conduit.

4. The combination with an internal combustion engine having a throttle controlled intake manifold, a clutch connecting the engine with the driven mechanism, a vacuum operable device for actuating said clutch, said device comprising two power fluid receiving compartments, a three-way control valve for said device comprising ports adapted to be connected with the vacuum device, the manifold and the atmosphere, a conduit interconnecting the atmospheric port of said valve with one compartment of said vacuum device, and valve means for regulating the flow of air through said conduit to control the engagement of the clutch.

5. The combination with an internal combustion engine adapted to create a vacuum, of a clutch connecting the engine with a driven mechanism, a vacuum operable device for actuating said clutch, a valve chamber in communication with said device, a conduit leading from said engine to one end of said chamber, a second conduit leading from said engine to the walls of said chamber, and a spring controlled plunger slidable in said chamber which is adapted to be drawn into one position upon creation of a vacuum in said chamber for permitting air to be drawn from said device to said chamber and second mentioned conduit, and returned to normal position by the spring upon a decrease in the vacuum created by said engine for closing said second mentioned conduit and opening said device to atmospheric pressure by means of said first mentioned conduit.

6. The combination with an internal combustion engine adapted to create a vacuum, of a clutch connecting the engine with a driven mechanism, a vacuum operable device for actuating said clutch, a valve chamber in communication with said device, a conduit leading from said engine to one end of said chamber, a second conduit leading from said vacuum device to the walls of said chamber, a spring controlled plunger slidable in said chamber which is adapted to be drawn into one position upon creation of a vacuum in said chamber for permitting air to be drawn from said device to said chamber and first mentioned conduit, and returned to normal position by the spring upon a decrease in the vacuum created by said engine for closing said second mentioned conduit and opening said device to atmospheric pressure, and means for adjusting the spring tension of said plunger for varying the requirement of suction thereon.

7. In a controlling device for a pneumatically operated motor comprising a casing, a port therein communicating with the motor, spaced ports therein communicating with a chamber in which subatmospheric pressure fluctuates and a bleed port therein, a member movable between at least two positions, said member having two oppositely disposed faces, means to constantly expose one of said faces to the subatmospheric pressure in said chamber through one of said spaced ports, a vent to expose the other face to atmospheric pressure and means to apply a predetermined force to said member acting in the direction opposite to the force of atmospheric pressure, said member being formed with communicating means establishing communication between the first named port and the other spaced port in one position and between the first named port and the bleed port in a second position.

8. In a controlling device for a pneumatically operated motor, the combination with an internal combustion engine having suction inducing means, a pneumatically operated motor operatively connected with a shifting member and connected in communicating relation with the suction producing means whereby the motor is subjected thereto, of a casing, a valve member movable therein between two extreme positions, said valve having at least two faces directed in opposite directions, said casing being formed with a vent exposing one face to atmospheric pressure, a conduit connecting the motor with a port on the interior of the casing controlled by said valve member, spaced ports on the interior of the casing, one of which constantly exposes the other face to suction, a conduit between said last named ports and the suction producing means and adjustable yielding means opposing the atmospheric pressure on said face.

9. A clutch control mechanism for an automotive vehicle provided with an internal combustion engine and a clutch mechanism, the latter including a clutch pedal and comprising, in combination therewith, a fluid motor having two fluid receiving compartments, the piston of said motor being operatively connected with the clutch pedal, a fluid transmitting connection between said motor and the manifold of the engine, a vacuum operated three-way control valve interposed in said connection, said valve being automatically opened at a predetermined manifold vacuum to place the motor in circuit with the manifold to energize the motor and effect a disengagement of the clutch, and means to effect a by-passing of air from one compartment of the motor, and operative after the closing of the three-way valve, to control the influx of air to the motor to thereby regulate the mode of clutch reengagement.

JOHN C. ERTEL.